(12) United States Patent
Fujisawa et al.

(10) Patent No.: US 6,227,997 B1
(45) Date of Patent: *May 8, 2001

(54) HYBRID VEHICLE

(75) Inventors: Yutaka Fujisawa, Tokyo; Chiaki Harada, Zama, both of (JP)

(73) Assignee: Nissan Motor Co., Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/323,884

(22) Filed: Jun. 2, 1999

(30) Foreign Application Priority Data

Jun. 15, 1998 (JP) .................................. 10-166882

(51) Int. Cl.$^7$ ..................................... B60K 41/22
(52) U.S. Cl. ............................. 477/5; 477/87; 192/3.56; 192/3.63
(58) Field of Search .................................. 477/5, 13, 87; 192/3.56, 3.63

(56) References Cited

U.S. PATENT DOCUMENTS

| 4,657,123 | * | 4/1987 | Sakakiyama | 477/87 |
| 4,674,611 | * | 6/1987 | Sakakiyama | 477/87 |
| 4,977,988 | * | 12/1990 | Tanaka | 477/87 |
| 6,048,289 | * | 4/2000 | Hattori et al. | 477/5 |

FOREIGN PATENT DOCUMENTS 9-286245   11/1997   (JP) .

* cited by examiner

Primary Examiner—Sherry Estremsky
(74) Attorney, Agent, or Firm—Foley & Lardner

(57) ABSTRACT

A hybrid vehicle is driven by an engine and/or motor by tightening and releasing a clutch interposed between the engine and a transmission. A selector lever position is detected, and a clutch current is interrupted when the selector lever is not in a range for forward motion. In this way, the clutch current is forcibly interrupted when the vehicle is not moving forward, so tightening of the clutch is definitively prevented even if a clutch current control CPU operates incorrectly.

3 Claims, 2 Drawing Sheets

7: SELECTOR LEVER POSITION SENSOR
8: ACCELERATOR PEDAL DEPRESSION AMOUNT SENSOR
9: VEHICLE SPEED SENSOR

HYBRID VEHICLE

FIELD OF THE INVENTION

This invention relates to a hybrid vehicle equipped with an engine and a motor as a power source.

BACKGROUND OF THE INVENTION

A hybrid vehicle driven by a motor and an engine connected in series via a clutch is disclosed in Tokkai Hei 9-286245 published by the Japanese Patent Office in 1997. In this vehicle, at low engine rotation speed when the engine efficiency is low and the vehicle is starting under low load, the clutch is released and the vehicle is driven only by the motor. When the vehicle speed has risen to some extent, the clutch is engaged and the power source is changed over from the motor to the engine.

SUMMARY OF THE INVENTION

In a hybrid vehicle having such a construction, the vehicle can be reversed if a clutch is released and the rotation of the motor is reversed, so there is no need to provide a transmission with a reverse gear to change over a drive force transmission direction from forward to backwards.

However, if a clutch current control CPU which controls the tightening and release of a clutch performs a faulty operation and the clutch is mistakenly tightened when the vehicle is reversing, the engine interferes with the operation of the motor and the vehicle cannot reverse smoothly.

It is therefore an object of this invention to prevent erroneous tightening of the clutch when reversing.

In order to achieve the above object, this invention provides a hybrid vehicle which is equipped with an engine and a motor as a power source, comprising a transmission connected to the motor, a clutch interposed between the engine and motor, drive wheels connected to the transmission, a selector lever for selecting an operating mode from plural modes of the transmission, the operating modes comprising a forward running mode, a sensor for detecting a position of the selector lever, and a clutch current interrupting circuit for forcibly interrupting a current output to the clutch when the selector lever is in a position corresponding to a mode other than the forward running mode.

The details as well as other features and advantages of this invention are set forth in the remainder of the specification and are shown in the accompanying drawings.

DESCRIPTION OF THE PREFERRED EMBODIMENTS

Figure 1:
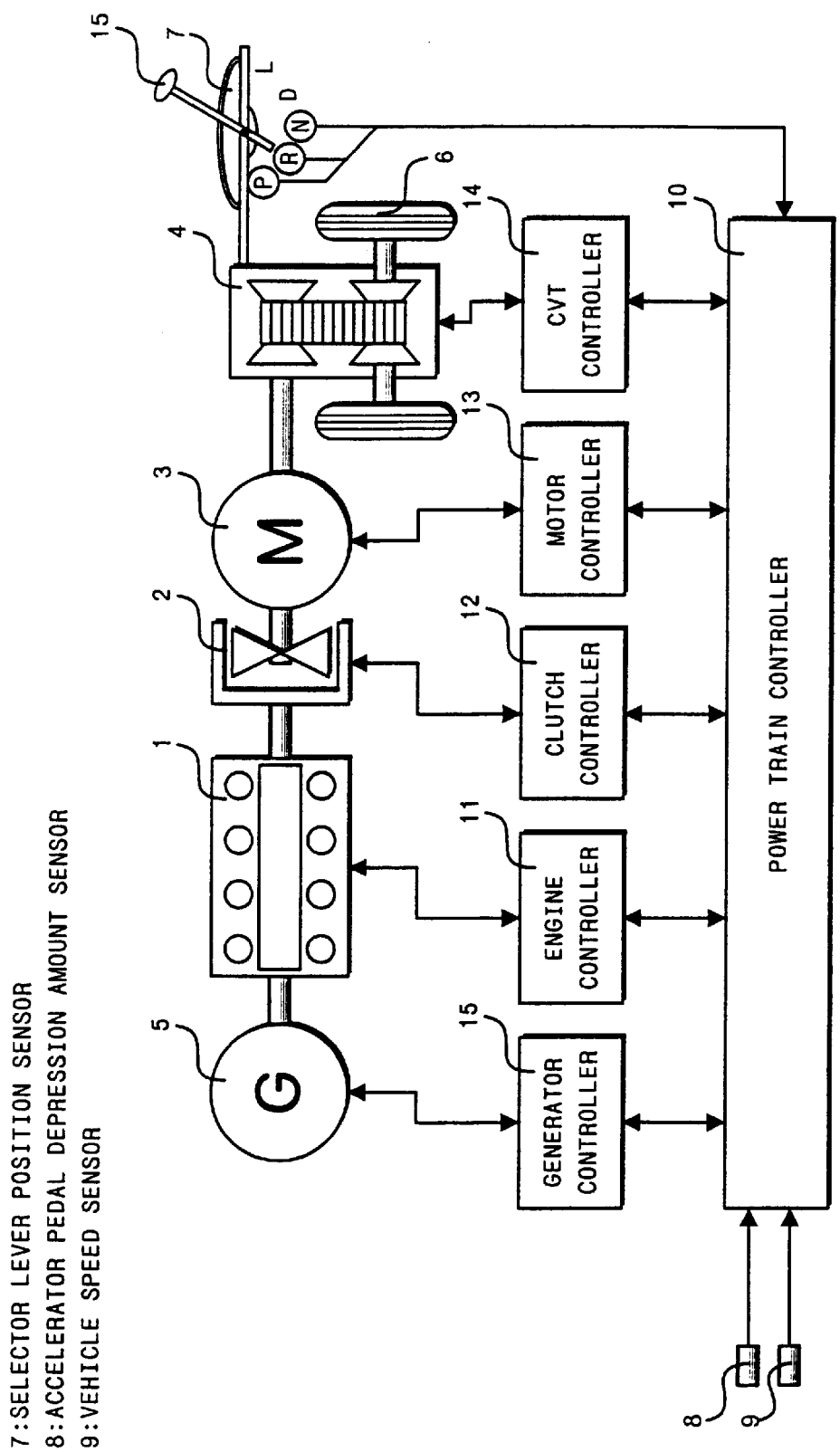
FIG. 1 is a schematic diagram of a hybrid vehicle according to this invention.

Referring to FIG. 1 of the drawings, a hybrid vehicle is equipped with an engine 1, clutch 2, motor 3, continuously variable transmission (CVT) 4, a final reduction gear unit, not shown, and drive wheels 6.

The output shaft of the engine 1 is connected to the input shaft of the clutch 2. A common output shaft of the clutch 2 and motor 3 is connected to the input shaft of the CVT 4.

The motor 3 is interposed between the clutch 2 and CVT 4. The motor 3 may also be connected on the other side of the CVT 4 from the clutch.

The clutch 2 can adjust the torque transmitted from an input shaft to an output shaft. The clutch 2 may for example be an electromagnetic powder clutch which can regulate the transmitted torque according to the intensity of an exciting current passed in an electromagnetic coil.

When the clutch 2 is engaged, the engine 1 and motor 3 drive the vehicle. When the clutch 2 is released, only the motor 3 drives the vehicle. In general, the clutch 2 is released when the vehicle is starting or running at a very low speed, where the efficiency of the engine 1 is low, and the vehicle is driven only by the motor 3.

If the vehicle speed increases to some extent, the clutch 2 is engaged and the power supply to the motor 3 is cut, the power source is changed over from the motor 3 to the engine 1, and the vehicle is driven by the engine 1. When a large drive force is required as when the vehicle is accelerating from rest with the throttle Filly open, the clutch 2 is engaged and the vehicle is driven by both the engine 1 and motor 3 by not cutting the power supply to the motor 3.

A generator 5 is connected on the opposite side of the output shaft of the engine 1. The generator 5, when the engine 1 is running, generates electric power. The generator 5 is also driven by electric power from a battery, not shown, and is used as a starter motor when starting the engine 1.

The CVT 4 is a belt CVT which can vary a speed ratio continuously. The CVT 4 operates according to a shift pattern of P(Parking)-R(Reverse)-N(Neutral)-D(Drive)-L (Low) which is selected via a selector lever 15. The CVT 4 may be a toroidal CVT or a conventional transmission using planetary gears.

A selector lever position sensor 7 for detecting the position of the selector lever 15 is connected to the CVT 4. A signal corresponding to the range where the selector lever 15 is positioned, i. e., I Pt, "R", "N", "D" or "L", is input from the selector lever position sensor 7 to a power train controller 10.

In this hybrid vehicle, the vehicle can be reversed if the clutch 2 is released and the motor 3 is reversed, so there is no need to provide the CVT with a reversing gear.

The engine 1, clutch 2, motor 3, CVT 4 and generator 5 are controlled by an engine controller 11, clutch controller 12, motor controller 13, CVT controller 14 and generator controller 15, respectively.

Signals are input to the power train controller 10 from the selector lever position sensor 7, an accelerator pedal depression amount sensor 8 and a vehicle speed sensor 9 together with the running state of the engine 1, clutch 2, motor 3, CVT 4 and generator 5, and the controllers 11–15 are controlled based on these signals.

Figure 2:
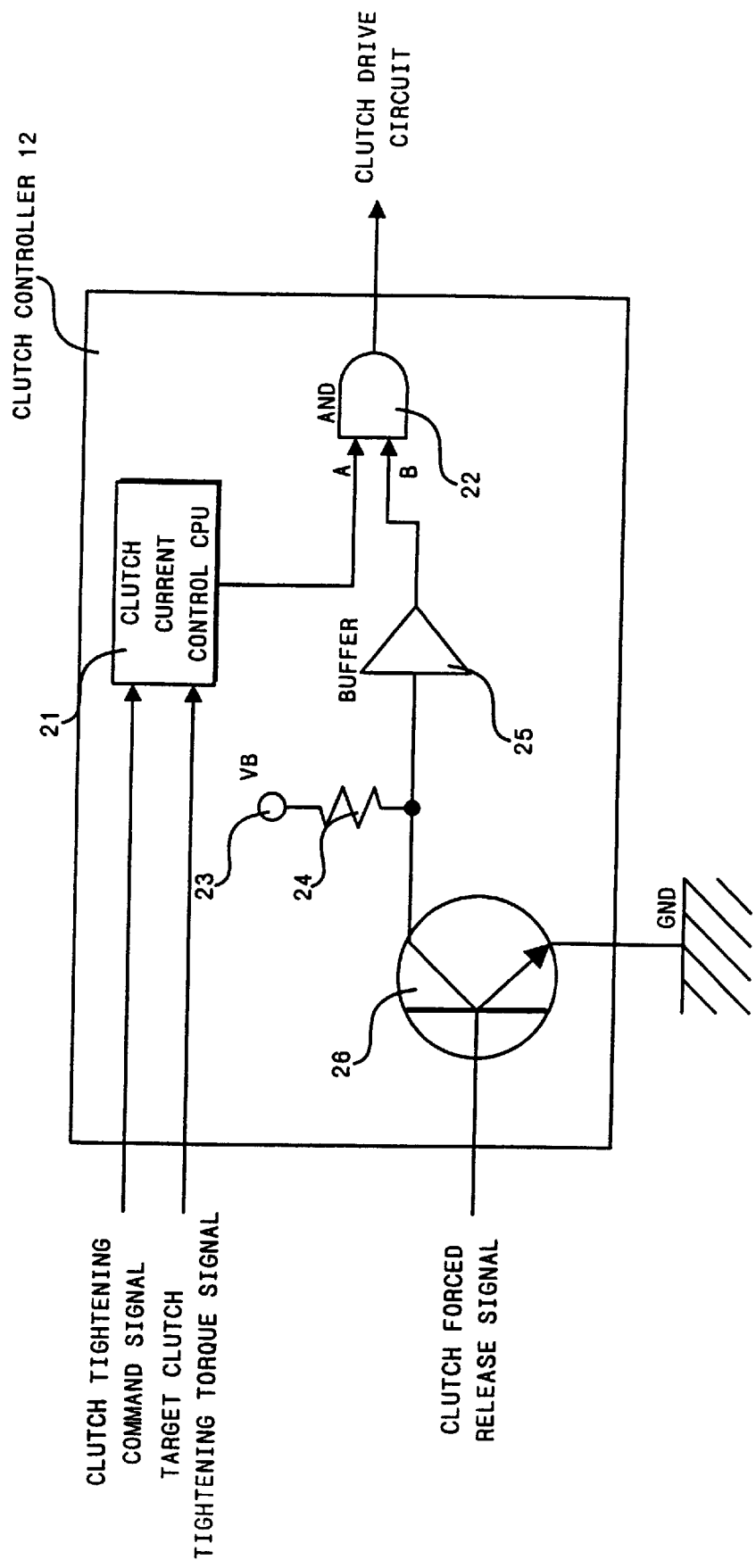
FIG. 2 is a logic circuit diagram of a clutch controller of the vehicle.

FIG. 2 shows a logical circuit of the clutch controller 12. The clutch controller 12 is equipped with a clutch current control CPU 21, AND circuit 22, terminal 23, resistor 24, buffer amplifier 25 and transistor 26.

A clutch tightening command signal and target clutch tightening torque signal are input to the clutch current control CPU 21 from the power train controller 10. The clutch current control CPU 21 computes the clutch current value output to the drive circuit of the clutch 2 based on these signals. The computed clutch current value is input to a terminal A of the AND circuit 22.

A battery power is input to the terminal 23. The voltage VB of the battery power is 12 volt. The battery power is input to the terminal B of the AND circuit 22 via the resistor 24 and buffer amplifier 25. The AND circuit 22 computes the logical sum of the terminal A and the terminal B, and outputs the result to the drive circuit of the clutch 2, not shown.

The battery power is input also to the collector terminal of the transistor 26 via the resistor 24. Therefore, although the potential of the terminal B of the AND circuit 22 is HIGH when a clutch forced release signal input to the base terminal of the transistor 26 is OFF, the terminal 23 is earthed and the potential of the terminal B of the AND circuit 22 is LOW when the clutch forced release signal is ON. This clutch forced release signal is input from the power train controller 10. When the selector lever 15 is not in the "D" range or "L" range for forward motion or when the output of the engine 1 is used only for power generation, the clutch forced release signal is ON, and at other times it is OFF.

Table 1 shows the characteristics of the logic circuit.

TABLE 1

| selected range | CFR signal | transistor | terminal B | output of CPU 21 | output to clutch drive circuit |
|---|---|---|---|---|---|
| D, L | OFF | OFF | HIGH | CPU | CPU |
|  |  |  |  | OFF | OFF |
| P, R, N | ON | ON | LOW | CPU | OFF |
|  |  |  |  | OFF | OFF |

CFR signal: clutch forced release signal

As seen from this table, when the selector lever 15 is in the "D" range or "L" range for forward motion, the clutch forced release signal input from the power train controller 10 is OFF and the transistor 26 is OFF, so the potential of the terminal B of the AND circuit 22 is HIGH. Therefore, the output of the clutch current control CPU 21 is output to the clutch drive circuit without modification.

On the other hand, when the selector lever 15 is in the "P" range, "R" range or "N" range which are not used for forward motion, the clutch forced release signal input from the power train controller 10 is ON and the transistor 26 is ON, so the potential of the terminal B of the AND circuit 22 is LOW. Therefore, the clutch current output to the clutch drive circuit from the AND circuit 22 is always OFF regardless of the output of the clutch current control CPU 21.

Moreover, although not shown in Table 1, the clutch forced release signal input from the power train controller 10 is ON also when using the engine 1 only for power generation. Therefore, the clutch current output to the clutch drive circuit from the AND circuit 22 is always OFF regardless of the output of the clutch current control CPU 21, as in the case when the selector lever 15 is in a range not used for forward motion.

Therefore, in the hybrid vehicle according to this invention, when the selector lever 15 is in the "D" range or "L" range used for forward motion, the clutch forced release signal OFF is output to the clutch controller 12 from the power train controller 10, and the output of the clutch current control CPU 21 in the clutch controller 12 is output to the clutch 2 without modification.

On the other hand, if the selector lever 15 is in the "R" range for reverse, the clutch forced release signal ON is output to the clutch controller 12 from the power train controller 10, and output to the clutch 2 is OFF regardless of the output of the clutch current control CPU 21.

During reverse, the clutch 2 is released and the vehicle is driven only by the motor 3 as described above. Even if the clutch current control CPU 21 operates incorrectly at this time, a clutch current is prevented from flowing through the clutch 2, so the clutch 2 is prevented from being accidentally tightened.

When the selector lever 15 is in the "P" range and "N" range also, the clutch forced release signal ON is output to the clutch controller 12 from the power train controller 10. Therefore, even if the clutch current control CPU 21 operates incorrectly when the engine 1 is used to generate power when the vehicle has stopped, shutting off of clutch current and tightening of the clutch 2 is prevented.

If the battery voltage decreases when the vehicle is advancing or reversing under the motor 3 alone, the engine 1 starts in order to charge the battery, and the vehicle continues to run under the motor while the generator 5 is driven by the engine 1 to charge the battery. As a clutch forced release signal ON is output to the clutch controller 12 from the power train controller 10 and the clutch current is forcibly interrupted also at this time, incorrect tightening of the clutch 2 is prevented.

As described above, except during forward motion or when the output of the engine 1 is used only for power generation, the clutch current is forcibly interrupted, so the clutch is released regardless of the output of the clutch current control CPU 21. As a result, even if the clutch current control CPU 21 operates incorrectly, the clutch 2 is not accidentally tightened.

According to this embodiment, the signal from the selector lever position sensor 7 is input to the power train controller 10, but the signal from the selector position lever 7 can also be directly input to the clutch controller 12. In this case, the circuit of the clutch controller 12 is designed to forcibly interrupt the clutch current according to this signal.

The entire contents of Japanese Patent Application P10-166882 (filed Jun. 15, 1998) are incorporated herein by reference.

Although the invention has been described above by reference to certain embodiments of the invention, the invention is not limited to the embodiments described above. Modifications and variations of the embodiments described above will occur to those skilled in the art, in light of the above teachings.

The scope of the invention is defined with reference to the following

What is claimed:

1. A hybrid vehicle which is equipped with an engine and a motor as a power source, comprising:

a transmission connected to said motor, a clutch interposed between said engine and motor, drive wheels connected to said transmission, a selector lever for selecting an operating mode from plural modes of said transmission, said operating modes comprising a forward running mode, a sensor for detecting a position of said selector lever, and a clutch current interrupting circuit for forcibly interrupting a current output to said clutch when said selector lever is in a position corresponding to a mode other than said forward running mode.

2. A hybrid vehicle as defined in claim 1, wherein said operating modes of said transmission further comprise a parking mode, a reverse running mode and a neutral mode.

3. A hybrid vehicle as defined in claim 1 further comprising:

a generator connected to said engine and a determining circuit for determining to use said engine only for power generation, wherein said clutch current interrupting circuit forcibly interrupts current output to said clutch also when said determining circuit determines to use said engine only for power generation.

* * * * *